April 9, 1963
C. G. STUCKE
3,084,944
EXPANSION-COMPENSATING SEALING DEVICE
Filed July 16, 1959
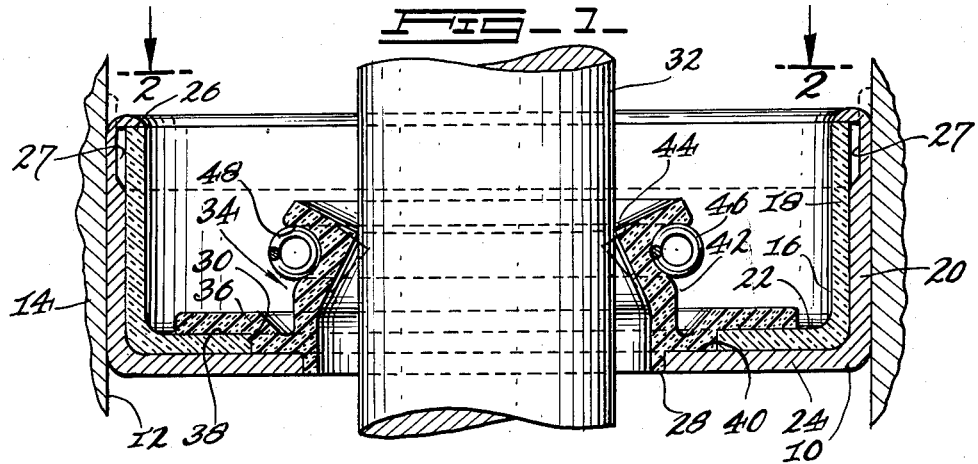
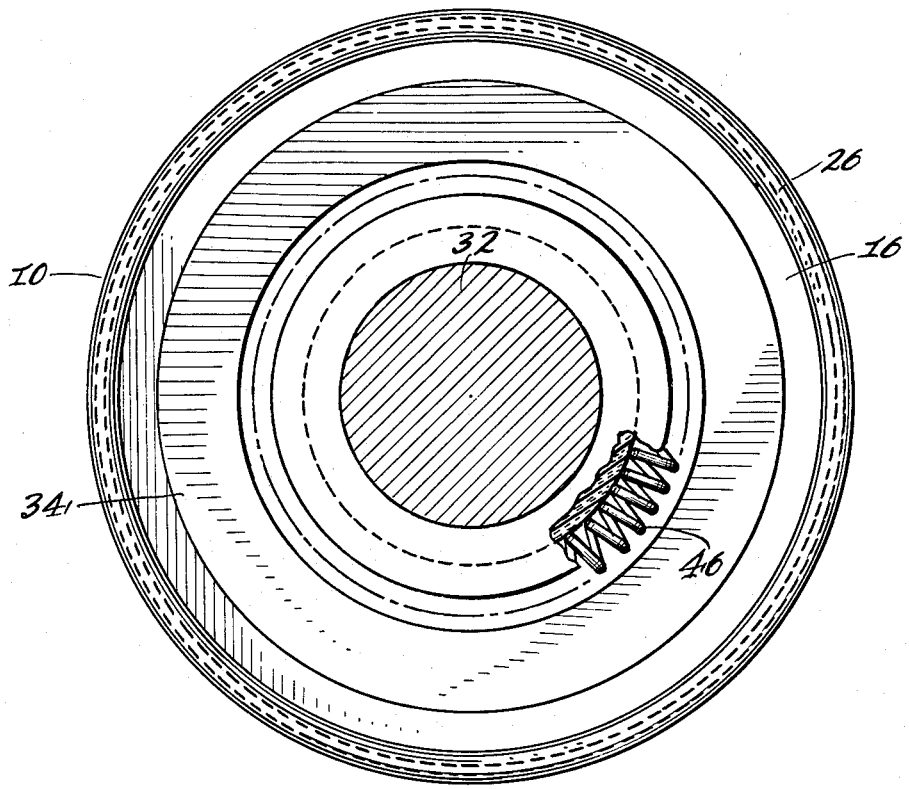
INVENTOR:
CHARLES G. STUCKE
BY Robert Henderson
ATTORNEY.

United States Patent Office

3,084,944
Patented Apr. 9, 1963

3,084,944
EXPANSION-COMPENSATING SEALING DEVICE
Charles G. Stucke, Palmyra, N.Y., assignor to Garlock Inc., a corporation of New York
Filed July 16, 1959, Ser. No. 827,486
3 Claims. (Cl. 277—26)

This invention relates to devices for effecting a seal between two relatively movable machine elements to oppose or prevent the passage of fluid such, for example, as a lubricant or of dirt or other foreign matter between said elements. More particularly, it relates to such seals which may compensate for variations in the sizes of such elements and/or parts of such seals caused by varying temperature conditions.

In recent years, there has been a trend, in machine construction, toward the use of metals other than iron or steel for machine bodies, casings and other machine parts. Thus, for example, aluminum is supplanting iron and steel for use in machine parts to take advantage of the light weight of aluminum. Where aluminum supplants iron or steel in machine parts which are subject to varying temperature conditions in a machine's use, the higher thermal coefficient of expansion of aluminum accounts for the existence of problems in providing efficient coaction of aluminum parts with parts which, because of particular requirements such as strength, for example, are preferably of steel or other metal similarly stronger than aluminum but having a lower coefficient of expansion than aluminum.

Still commenting in terms of examples, it has been common practice, in providing such seals or sealing devices, to design them to include a shell of thin or sheet steel which fits with a tight seal fit in a shaft or rod opening in an iron or steel machine casing or upon a steel shaft or rod extending through such an opening. In either of these arrangements, the steel shell, under varying temperature conditions, expands and contracts similarly to the machine part in or on which it is mounted so that the tight seal fit of said shell with respect to such a machine part is continuously maintained to maintain the efficiency of the seal for sealing purposes.

It might appear that, where such machine parts are of aluminum, the maintenance of a tight seal fit of a seal with respect to such a machine part could be satisfactorily achieved by making the seal's shell of aluminum instead of steel. Aluminum, however, particularly in thin sections of a drawing grade of aluminum such as is necessarily used as a practical matter in making such shell parts of special shapes, is much weaker or more readily deformable than steel sections of similar thickness, not only under relatively high temperatures such as are encountered in motors or other machines; but also under room and processing temperatures encountered in manufacturing such seals. For that reason, among others, the mere substitution of aluminum for steel in such seal shells does not solve the problem.

An important object of this invention, accordingly, is the provision of a sealing device having a metal shell of ample strength and satisfactory sealing characteristics even though such strength and sealing characteristics would not be present in a seal shell formed merely of the same metal as the machine part with which the shell is directly associated.

Another important object is the provision of a sealing device which includes a rigidifying member of steel or other similarly strong metal and which provides satisfactory sealing means in association with machine parts of metal having a substantially different thermal coefficient of expansion than the metal of the rigidifying member.

These and other more or less obvious objects are achieved, in general, according to this invention, by providing a shell, for such a seal, formed of separate, telescoped parts formed of two different metals; the one of said shell parts intended for tight, static, sealing engagement with one of two relatively movable machine elements being of the same metal as said one machine element or of a metal having a thermal coefficient of expansion closely approximating that of said one machine element, and the metal of the other of said shell parts being stronger to give adequate rigidity to the seal shell as a whole. Somewhat more specifically, the invention comprehends an association of the two shell parts that enables the shell part in such static sealing engagement with said one machine element to expand and contract similarly to the latter element to maintain said engagement therewith while the two shell parts are held tightly together in condition to oppose or block the passage of sealed fluid therebetween.

Although the present invention is usable in many types of sealing devices having metal shells, it is shown, for illustrative purposes, in the accompanying drawing as embodied in only one such device without, however, limiting this invention to its applicability to that particular device.

In the drawing:

FIGURE 1 is a central, axial sectional view of a sealing device according to a preferred embodiment of this invention in operating association with fragmentarily shown portions of a shaft and a machine casing.

FIG. 2 is an end elevational view of said device as viewed from the line 2—2 of FIG. 1.

The sealing device, as illustrated, comprises an outer, annular, cup-shaped, metal shell member 10 which, for the illustrative purposes of this description, is to be considered as of aluminum, and fits with a tight, static, sealing fit within a bore 12 of a machine casing 14 likewise to be considered as of aluminum. Nested within shell member 10 is an approximately similarly shaped but smaller, inner, metal shell member 16, a cylindrical flange 18 of which is disposed within a cylindrical flange 20 of the outer shell member. A flat, radial flange 22 of the inner shell member is held tightly against the inner surface of a flat, radial flange 24 of the outer shell member, by rolled-in end portion or annular lip 26 of the outer shell member, which lip is thinned or relieved as at 27 and extends inwardly into abutment and axial alignment with the free edge of the inner shell member's cylindrical flange 18. The inner shell member 16 should be of steel or other relatively strong metal. The mentioned thinning and disposition of the lip 26 enables it to cooperate in locking the two shell members together while, nevertheless, permitting slight radial displacement of those parts in relation to each other.

The two shell members 10 and 16 (hereinafter sometimes referred to collectively merely as a "shell") are centrally apertured as at 28 and 30 to permit passage therethrough of a shaft 32 which turns within the bore 12 in relation to the surrounding machine casing 14. The aperture 30 may advantageously be somewhat larger than aperture 28 to provide ample surface permitting adequate bonding of an annular, flexible sealing element 34 to the inner margin of the shell, although, with some variation in the element 34, the latter may be adequately bonded to the shell even if said apertures are of the same size or if aperture 28 is larger than aperture 30.

The flexible sealing element 34 is of relatively soft, flexible rubber, synthetic rubber or other suitable, flexible rubber-like material (hereinafter referred to merely as "rubber"). It is molded to the approximate sectional shape illustrated and, by well-known bonding procedure, including suitable adhesives if desired or needed, an annular mounting portion 36 of said flexible element is bonded to flat marginal surfaces 38 and 40 of the shell flanges 22 and 24 and to the edge surfaces defining the apertures 28 and 30. Integral with mounting portion 36 of the flexible sealing element is an annular sealing flange 42, an internal edge or sealing lip 44 of which slidably engages about shaft or rod 32 to maintain a sliding sealing coaction therewith at all times. The lip 44 and adajacent portions of sealing flange 42 are molded to the somewhat smaller diameter thereof indicated in broken lines in FIG. 1 and are stretched somewhat when the sealing device, upon installation, is pushed endwisely onto the shaft so that the resilience of said lip causes it to firmly yet slidably engage the shaft, as shown in full lines in said figure.

Under some operating conditions, such as ride-out or whipping of the shaft, and because of compositional or shape changes arising from use, aging and/or wear of the device, the lip 44 tends less strongly to retain its sliding engagement with the shaft; therefore, it is advantageous to provide a contractile, circular or garter spring 46 tensioned about the lip area of the sealing flange 42 within a circular groove 48 provided in the latter flange. Such a spring assures continued and continuous sealing coaction of the lip 44 with the shaft throughout the life of the seal.

It may be seen that very substantial advantages result from the disclosed shell structure. A first advantage is that if, for example, the inner shell member 16 is of steel, and the machine casing 14 of aluminum, the outer shell member 10 may also be of aluminum or of any other metal or alloy having a coefficient of thermal expansion closely approximating that of aluminum and greater than that of steel; so that, under varying temperatures present during operation of the machine in which the seal is installed, usually higher than the temperature present during manufacture of the seal, expansion and contraction of the outer shell member is permitted, independently of the inner shell member, approximately to the same extent as the concurrent expansion and contraction of the machine casing. It results, then, that the described tight, static, sealing fit of the outer shell member to the machine casing is maintained, thereby maintaining an adequate sealing effect therebetween.

It is recognized that, under such varying temperature conditions, the lesser expansion of the inner shell member will give rise to a slight looseness or spacing between the two shell members. However, such spacing under any conditions would be infinitesimal and would not impair the capacity of the relatively strong inner shell member to support the relatively weak outer shell member against any material wrinkling or other deformation which, theoretically, might arise from its tight or constricted engagement within the machine casing.

A second advantage arises from the provision of the inner shell member 16 of steel or other relatively strong metal. As a practical matter, shells for shaft seals are advantageously made usually of sheet or thin metal and in very small seals, now provided in many instances for very small shafts, the metal employed is very thin indeed. If the shell were to consist only of a single shell member of thin aluminum, the shell would be relatively weak and in many instances would become so deformed prior to installation as to make difficult or impossible its insertion into a bore in the machine casing. Also, handling of a thin aluminum shell member, either by hand or mechanically, as occurs in certain stages of the manufacture of such a sealing device, would often so deform it as to render it useless. Such handling might occur, for example, in molding and bonding the rubber-like element 34 to the shell under rather high temperature conditions, then in a subsequent deflashing operation and in packing the device for shipment. Moreover, handling by the user might cause deformation. Such pre-use deformation of the shell also would tend to impair the sealing effect between the shell and the machine casing. Also, under some temperature conditions, a thin aluminum shell, weakened by heat and unsupported by a separate, strong shell member, would tend toward deformation after installation.

A third advantage is the minimizing of heat transfer from a relatively hot area of a related mechanism to the rubber sealing element 34 or to a more or less equivalent sealing element which might be adversely affected by excessive heat. In this relation, it may be observed that the metal in machine casing 14 often is at a much higher temperature, during operation, than the metal in the shaft 32. Thus, while the rubber sealing element suffers little if any adverse effect from heat from the shaft, it may be harmed considerably by heat from the casing 14 unless adequate means are present to prevent or minimize transfer of heat from said casing to the rubber sealing element. In devices according to this invention, a shell area such as, for example, the flange 20, may receive heat readily from the casing 14 within which it is tightly fitted; however, as the temperature of the flange 20 rises, the fit of flange 18 therewith becomes progressively looser, thereby reducing heat transfer between the two said flanges. In this way, the rubber sealing element is safeguarded against the reception of excessive heat from the machine casing.

Although expansion of the outer shell member 10 may be greater than concurrent expansion of the inner shell member 16, thereby producing, at least theoretically, a slight space or clearance between those two members, such a space or clearance does not cause leakage of fluid between said members because of the blocking and sealing effect of the shell's lip 26 at one end of the seal and the rubber of the flexible element 34 at the other end of the seal.

This invention goes beyond its broad aspect of the provision of two shell members of two different metals. It includes also, in a more specific aspect, the disclosed or equivalent arrangement whereby said two members may quite independently expand and contract while held in substantially integrated association.

It should be obvious that the concepts of this invention may be utilized in a wide variety of seals designed for various purposes; also, that the members and elements directly related to said concepts may be of various shapes, relative sizes, materials and relationships without, however, departing from the invention as set forth in the following claims.

I claim:

1. A sealing device for effecting a seal between a cylindrical surface defining an opening in a machine casing of relatively weak metal and a cylindrical surface of a rod extending coaxially through said opening and being movable relatively to said casing, said device comprising an annular, outer shell member of sheet metal of approximately the same degree of strength and of approximately the same coefficient of thermal expansion as the metal of the casing at said opening, and having a cylindrical portion which is adapted to fit tightly into said opening and to expand and contract radially in response to temperature changes to approximately the same extent as concurrent expansion and contraction of adjacent metal portions of said casing at said opening, a separate, annular, inner shell member of sheet metal of greater strength and a lower coefficient of thermal expansion than said outer shell member and having a cylindrical portion extending closely within said cylindrical portion of said outer shell member to support the latter member against deformation, said shell members having inter-abutting portions opposing relative axial movement of said members, and the device further comprising an annular sealing element of flexible material, fluid-tightly secured against the outer one of said shell members and adapted to effect a sliding seal with said cylindrical surface of the rod.

2. A sealing device according to claim 1, said sealing element also being fluid-tightly secured against the inner one of said shell members whereby to oppose passage of fluid between the two shell members.

3. A sealing device according to claim 1, the metal of the casing at said opening and of said outer shell member being aluminum, and the metal of said inner shell member being steel.

References Cited in the file of this patent

UNITED STATES PATENTS

| | | |
|---|---|---|
| 2,173,006 | Victor | Sept. 12, 1939 |
| 2,769,231 | Grenell | Nov. 6, 1956 |
| 2,804,325 | Riesing | Aug. 27, 1957 |
| 2,889,163 | Stephens et al. | June 2, 1959 |
| 2,898,133 | Mirza | Aug. 4, 1959 |
| 2,948,555 | Wright | Aug. 9, 1960 |